US012537632B2

United States Patent
Khoshnevisan et al.

(10) Patent No.: US 12,537,632 B2
(45) Date of Patent: Jan. 27, 2026

(54) UPLINK CONTROL COMMUNICATION REPETITION IN MULTIPLE SLOTS USING DIFFERENT SETS OF TIME DOMAIN RESOURCES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Peter Gaal, San Diego, CA (US); Juan Montojo, San Diego, CA (US); Fang Yuan, Beijing (CN); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 614 days.

(21) Appl. No.: 17/906,806

(22) PCT Filed: Apr. 6, 2020

(86) PCT No.: PCT/CN2020/083412
§ 371 (c)(1),
(2) Date: Sep. 20, 2022

(87) PCT Pub. No.: WO2021/203219
PCT Pub. Date: Oct. 14, 2021

(65) Prior Publication Data
US 2023/0198682 A1 Jun. 22, 2023

(51) Int. Cl.
*H04L 1/1829* (2023.01)
*H04L 5/00* (2006.01)
(Continued)

(52) U.S. Cl.
CPC .......... *H04L 1/1858* (2013.01); *H04L 1/1861* (2013.01); *H04L 5/0053* (2013.01); *H04W 72/0446* (2013.01); *H04W 72/21* (2023.01)

(58) Field of Classification Search
CPC ... H04L 1/1858; H04L 1/1861; H04L 5/0053; H04W 72/21; H04W 72/0446
See application file for complete search history.

(56) References Cited

U.S. PATENT DOCUMENTS

2018/0331807 A1\* 11/2018 Kim ...................... H04L 5/0053
2020/0107319 A1   4/2020 Bagheri et al.
(Continued)

FOREIGN PATENT DOCUMENTS

CN   105515747 A   4/2016
CN   109672511 A   4/2019
(Continued)

OTHER PUBLICATIONS

ERICSSON: "On Long PUCCH Repetition and Other Issues", 3GPP TSG RAN WG1 Meeting AH 1801, R1-1800948, 3rd Generation Partnership Project, Mobile Competence Centre, 650, Route Des Lucioles, F-06921 Sophia-Antipolis Cedex, France, vol. RAN WG1, No. Vancouver, Canada, Jan. 22-Jan. 26, 2018, 5 Pages, Jan. 13, 2018, XP051385181, pp. 4, 5.
(Continued)

*Primary Examiner* — Siren Wei
(74) *Attorney, Agent, or Firm* — Harrity & Harrity, LLP

(57) ABSTRACT

Various aspects of the present disclosure generally relate to wireless communication. In some aspects, a user equipment may determine respective sets of time domain resources that are to be used for multiple repetitions of an uplink control information transmission in multiple slots; and transmit one or more of the multiple repetitions using the respective sets of time domain resources, or one or more other resources, in
(Continued)

the multiple slots based at least in part on determining the respective sets of time domain resources. Numerous other aspects are provided.

30 Claims, 8 Drawing Sheets

(51) Int. Cl.
*H04W 72/0446* (2023.01)
*H04W 72/21* (2023.01)

(56) References Cited

U.S. PATENT DOCUMENTS

| | | | | |
|---|---|---|---|---|
| 2020/0205150 | A1* | 6/2020 | Cheng | H04W 72/21 |
| 2020/0275436 | A1 | 8/2020 | Lin et al. | |
| 2020/0404692 | A1* | 12/2020 | Yin | H04L 1/1671 |
| 2021/0144720 | A1* | 5/2021 | Xu | H04L 5/0053 |
| 2021/0203397 | A1* | 7/2021 | Xiong | H04W 72/23 |
| 2022/0104224 | A1* | 3/2022 | Choi | H04W 72/1268 |
| 2023/0093264 | A1* | 3/2023 | Gao | H04W 52/16 |
| | | | | 370/329 |
| 2023/0171778 | A1* | 6/2023 | Kittichokechai | H04L 1/1671 |
| | | | | 370/329 |

FOREIGN PATENT DOCUMENTS

| | | | |
|---|---|---|---|
| EP | 3582563 | A1 | 12/2019 |
| WO | WO-2019095271 | A1 | 5/2019 |

OTHER PUBLICATIONS

Huawei, et al., "Long-Duration PUCCH Design", 3GPP TSG RAN WG1 Meeting #88bis, R1-1704208, 3rd Generation Partnership Project, Mobile Competence Centre, 650, Route Des Lucioles, F-06921 Sophia-Antipolis Cedex, France, vol. RAN WG1, No. Spokane, USA, Apr. 3-Apr. 7, 2017, Apr. 2, 2017, XP051242360, 4 pages, pp. 1-3.
Supplementary European Search Report—EP20930594—Search Authority—The Hague—Mar. 14, 2024.
Supplementary Partial European Search Report—EP20930594—Search Authority—The Hague—Dec. 21, 2023.
International Search Report and Written Opinion—PCT/CN2020/083412—ISA/EPO—Dec. 31, 2020-12.
LG Electronics: "Remaining Issues on UL Data Transmission Procedure", 3GPP Draft; R1-1800382 Remaining Issues on UL Data Transmission Procedure, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22-Jan. 26, 2018 Jan. 13, 2018, XP051384837, section 3.3.
NTT DOCOMO, et al., "Layer 1 Enhancements for NR URLLC", 3GPP Draft, 3GPP TSG RAN WG1 Meeting #94bis, R1-1811378, EURLLC L1 Enhancement, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8-Oct. 12, 2018, Sep. 29, 2018 (Sep. 29, 2018), XP051518782, 18 Pages, pp. 12-13, Table 1, Figure 8, Section 4.
Samsung: "Specification Update on UL Control Incorporating Proposals in RAN1#94," 3GPP TSG RAN WG1 #94, R1-1809707, Aug. 20-24, 2018 (Aug. 24, 2018), pp. 1-17, section 9.2.6.
Vivo: "Design of long-PUCCH over Multiple Slots", 3GPP Draft; R1-1717494 Design of long-PUCCH over Multiple Slots, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9-Oct. 13, 2017 Oct. 8, 2017, XP051340682, 4 pages.

* cited by examiner

UPLINK CONTROL COMMUNICATION REPETITION IN MULTIPLE SLOTS USING DIFFERENT SETS OF TIME DOMAIN RESOURCES

CROSS-REFERENCE TO RELATED APPLICATION

This Patent Application is a 371 national stage of PCT Application No. PCT/CN2020/083412 filed on Apr. 6, 2020, entitled "UPLINK CONTROL COMMUNICATION REPETITION IN MULTIPLE SLOTS USING DIFFERENT SETS OF TIME DOMAIN RESOURCES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink control communication repetition in multiple slots using different sets of time domain resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining respective sets of time domain resources that are to be used for multiple repetitions of an uplink control information transmission in multiple slots; and transmitting one or more of the multiple repetitions using the respective sets of time domain resources, or one or more other resources, in the multiple slots based at least in part on determining the respective sets of time domain resources.

In some aspects, a method of wireless communication, performed by a base station, may include determining respective sets of time domain resources that are to be used by a UE for multiple repetitions of an uplink control information transmission in multiple slots; and transmitting, to the UE, an indication of the respective sets of time domain resources to enable the UE to transmit one or more of the multiple repetitions using the respective sets of time domain resources, or one or more other resources, in the multiple slots.

In some aspects, a UE for wireless communication may include a memory and one or more processors operatively coupled to the memory. The memory and the one or more processors may be configured to determine respective sets of time domain resources that are to be used for multiple repetitions of an uplink control information transmission in multiple slots; and transmit one or more of the multiple repetitions using the respective sets of time domain resources, or one or more other resources, in the multiple slots based at least in part on determining the respective sets of time domain resources.

In some aspects, a base station for wireless communication may include a memory and one or more processors operatively coupled to the memory. The memory and the one or more processors may be configured to determine respective sets of time domain resources that are to be used by a UE for multiple repetitions of an uplink control information transmission in multiple slots; and transmit, to the UE, an indication of the respective sets of time domain resources to enable the UE to transmit one or more of the multiple repetitions using the respective sets of time domain resources, or one or more other resources, in the multiple slots.

In some aspects, a non-transitory computer-readable medium may store one or more instructions for wireless communication. The one or more instructions, when executed by one or more processors of a UE, may cause the one or more processors to determine respective sets of time domain resources that are to be used for multiple repetitions of an uplink control information transmission in multiple slots; and transmit one or more of the multiple repetitions using the respective sets of time domain resources, or one or more other resources, in the multiple slots based at least in part on determining the respective sets of time domain resources.

In some aspects, a non-transitory computer-readable medium may store one or more instructions for wireless communication. The one or more instructions, when executed by one or more processors of a base station, may cause the one or more processors to determine respective sets of time domain resources that are to be used by a UE for multiple repetitions of an uplink control information transmission in multiple slots; and transmit, to the UE, an indication of the respective sets of time domain resources to enable the UE to transmit one or more of the multiple repetitions using the respective sets of time domain resources, or one or more other resources, in the multiple slots.

In some aspects, an apparatus for wireless communication may include means for determining respective sets of time domain resources that are to be used for multiple repetitions of an uplink control information transmission in multiple slots; and means for transmitting one or more of the multiple repetitions using the respective sets of time domain resources, or one or more other resources, in the multiple slots based at least in part on determining the respective sets of time domain resources.

In some aspects, an apparatus for wireless communication may include means for determining respective sets of time domain resources that are to be used by a UE for multiple repetitions of an uplink control information transmission in multiple slots; and means for transmitting, to the UE, an indication of the respective sets of time domain resources to enable the UE to transmit one or more of the multiple repetitions using the respective sets of time domain resources, or one or more other resources, in the multiple slots.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
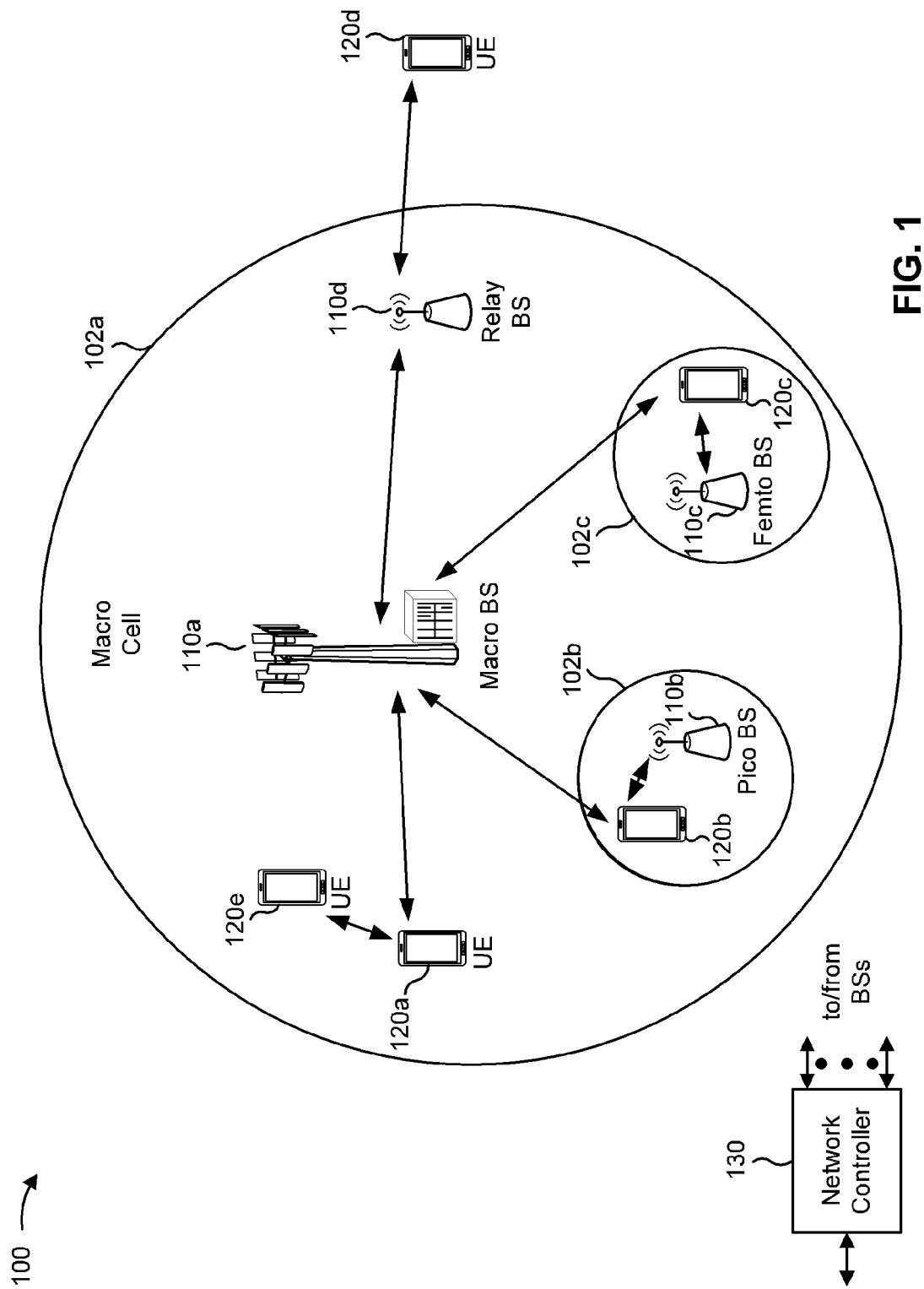
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
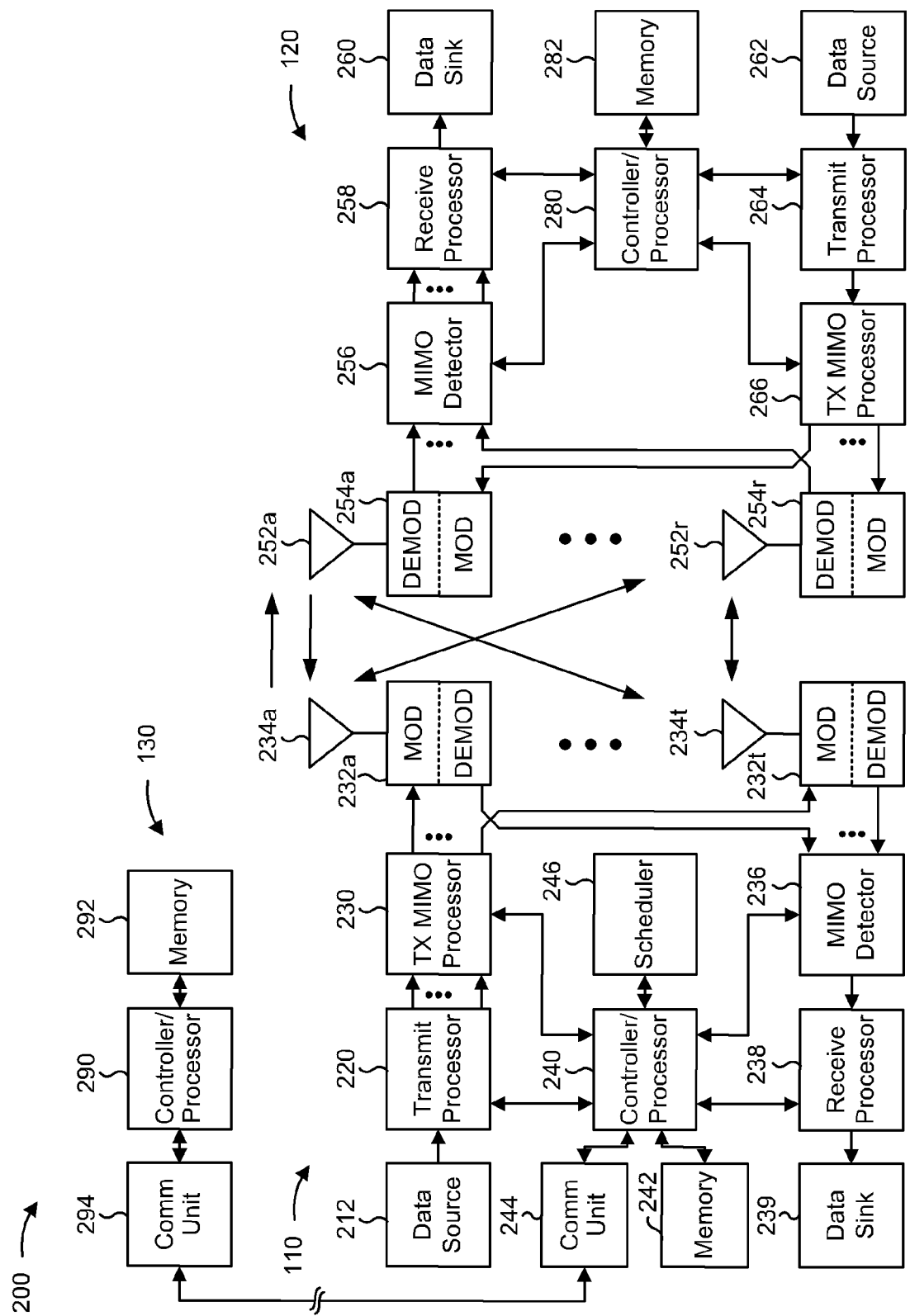
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink control communication repetition in multiple slots using different sets of time domain resources, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining respective sets of time domain resources that are to be used for multiple repetitions of an uplink control information transmission in multiple slots, means for transmitting one or more of the multiple repetitions using the respective sets of time domain resources, or one or more other resources, in the multiple slots based at least in part on determining the respective sets of time domain resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining respective sets of time domain resources that are to be used by a UE for multiple repetitions of an uplink control information transmission in multiple slots, means for transmitting, to the UE, an indication of the respective sets of time domain resources to enable the UE to transmit one or more of the multiple repetitions using the respective sets of time domain resources, or one or more other resources, in the multiple slots, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
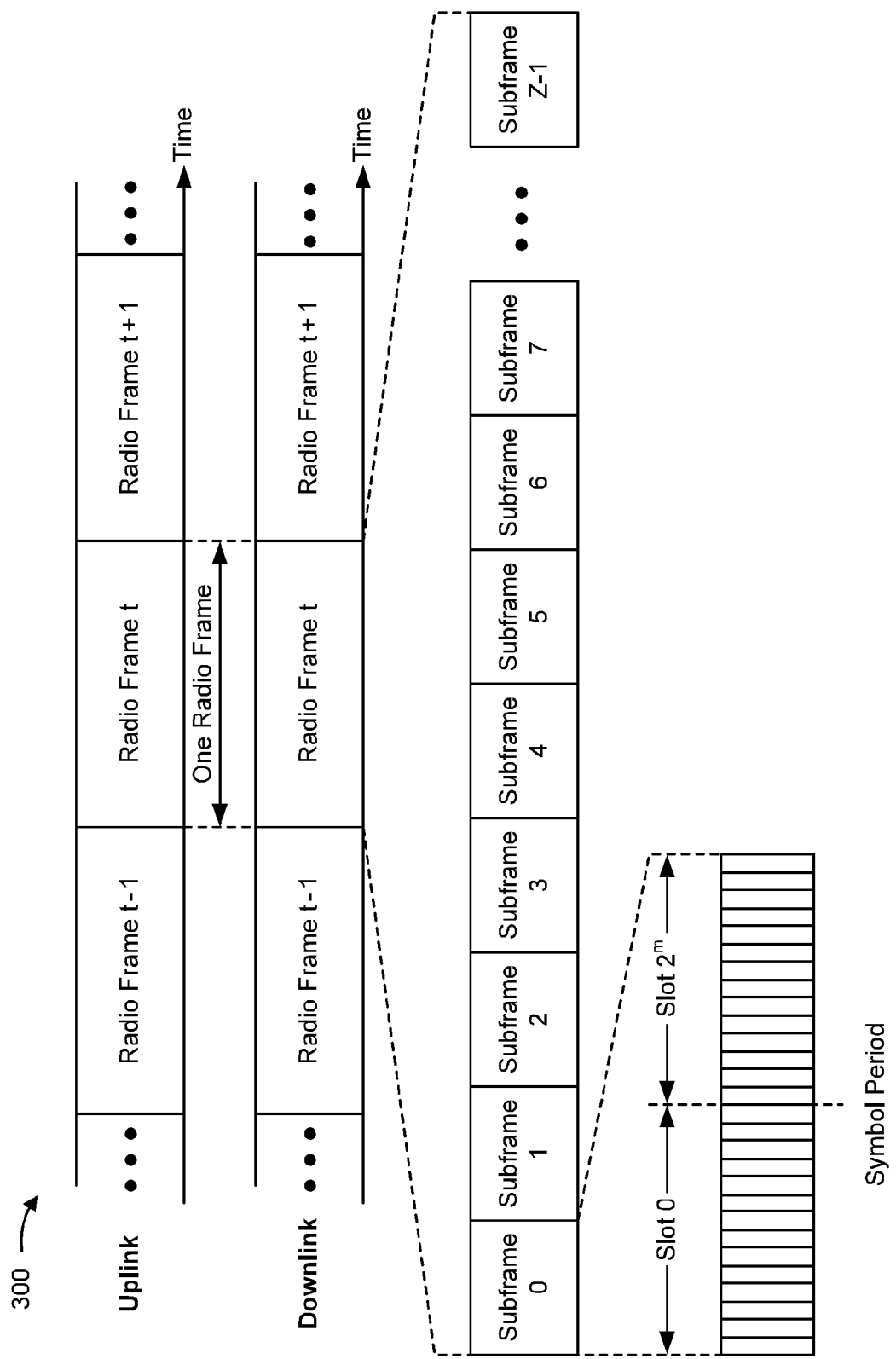
FIG. 3 is a diagram illustrating an example of a frame structure in a wireless communication network, in accordance with various aspects of the present disclosure.

FIG. 3 is a diagram illustrating an example 300 of a frame structure in a wireless communication network, in accordance with various aspects of the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L-1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Wireless communication devices, such as UEs, BSs, TRPs, and/or the like, may communicate with each other using repetitions of communications (e.g., by transmitting the same communication multiple times). For example, for uplink control communications, a BS may indicate a physical uplink control channel (PUCCH) resource to be used by a UE for multiple repetitions of an uplink control communication. The BS may indicate a PUCCH resource in one slot for multiple repetitions or a PUCCH resource in multiple slots (e.g., using the same time domain resources in each slot) to be used by the UE for multiple repetitions of the uplink communication.

In some cases, it may be beneficial for a UE to communicate multiple repetitions of an uplink control communication in multiple slots using different sets of time domain resources in each slot to reduce latency (e.g., using time domain resources at the end of a first slot for a first repetition and using time domain resources at the start of a second slot of a second repetition). However, one or more PUCCH resources to be used for the multiple repetitions may be configured to use the same time domain resources in each slot. As such, the UE may not be configured to use different sets of time domain resources in each slot for the multiple repetitions of the uplink control communication. As a result, a latency and/or reliability of communications may be impaired. Some techniques and apparatuses described herein enable a UE to communicate multiple repetitions of an uplink control communication in multiple slots using different sets of time domain resources in each slot. This may improve latency and/or reliability of communications in a wireless network.

Figure 4:
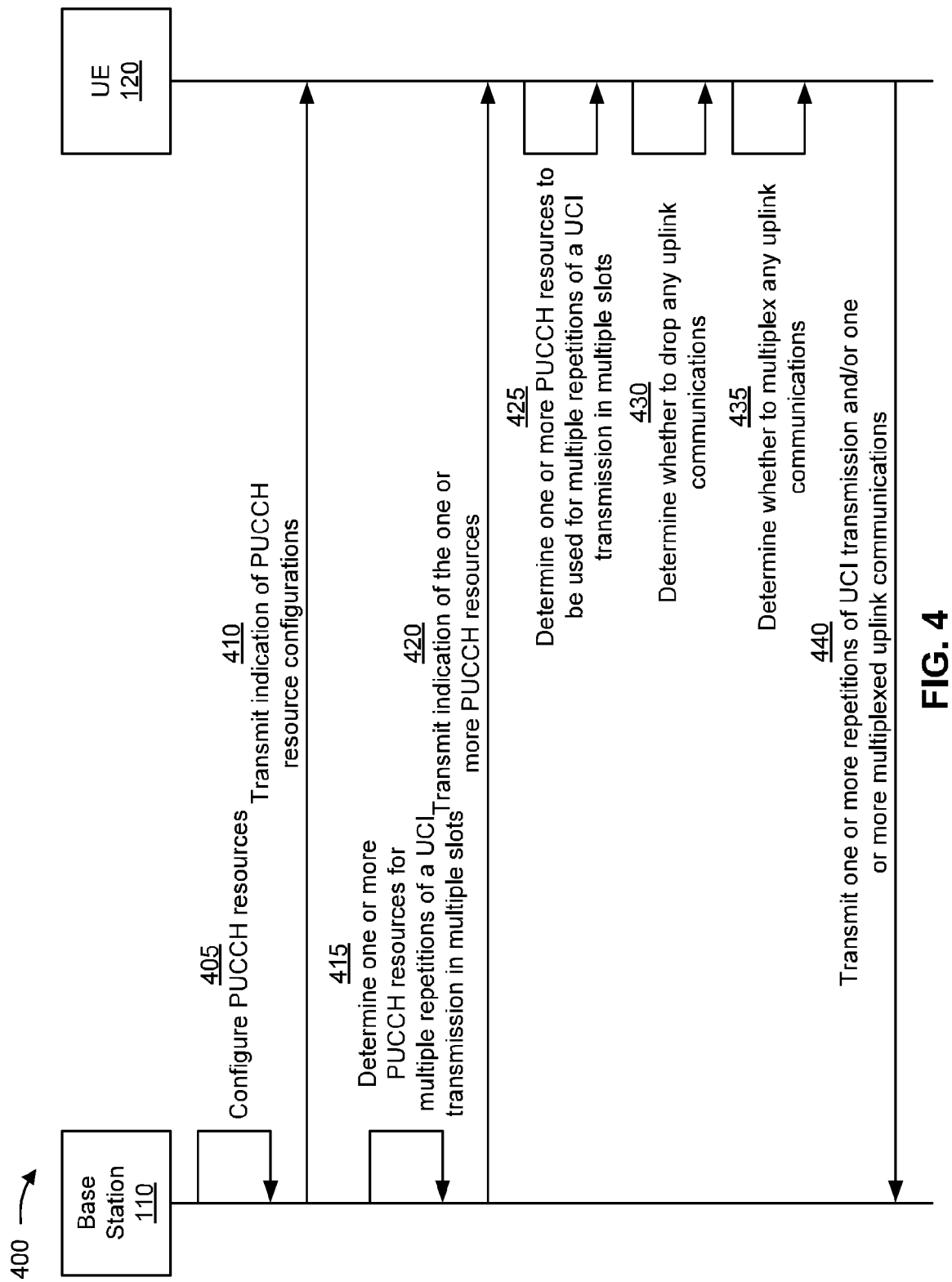
FIG. 4 is a diagram illustrating an example of uplink control communication repetition in multiple slots using different sets of time domain resources, in accordance with various aspects of the present disclosure.

FIG. 4 is a diagram illustrating an example of uplink control communication repetition in multiple slots using different sets of time domain resources, in accordance with various aspects of the present disclosure. As shown in FIG. 4, a base station 110 and a UE 120 may communicate with one another in a wireless network (e.g., wireless network 100).

As shown by reference number 405, the BS 110 may configure one or more PUCCH resources. The BS 110 may configure the one or more PUCCH resources using a radio resource control (RRC) protocol. Each PUCCH resource may be configured using one or more PUCCH formats. The PUCCH formats may include a short PUCCH format having a length of 1 or 2 symbols (e.g., PUCCH formats 0 or 2) and/or a long PUCCH format having a minimum length of 4 symbols (e.g., PUCCH formats 1, 3, or 4). For example, The BS 110 may configure the one or more PUCCH resources with one or more PUCCH resource parameters. The one or more PUCCH resource parameters may include a starting symbol parameter (e.g., indicating the starting symbol of the PUCCH resource in a slot), a length parameter (e.g., indicating a total quantity of symbols of the PUCCH resource), and/or a number of repetitions parameter (e.g., indicating the number of repetitions (if any) of the PUCCH resource).

In some aspects, the BS 110 may configure a first PUCCH resource in a first slot (e.g., indicated by a first starting symbol parameter and a first length parameter) and a second PUCCH resource in a second slot (e.g., indicated by a second starting symbol parameter and a second length parameter). The first PUCCH resource may occupy a first set of time domain resources in the first slot. The second PUCCH resource may occupy a second set of time domain resources in the second slot. For example, assuming each slot includes 14 symbols, the first PUCCH resource may be configured such that the first PUCCH resource occupies symbols 8-12 of the first slot. The second PUCCH resource may be configured such that the second PUCCH resource occupies symbols 2-6 of the second slot. The BS 110 may configure the first PUCCH resource and the second PUCCH resource such that the first PUCCH resource and the second PUCCH resource are linked together. For example, the BS 110 may configure a plurality of sets of PUCCH resources. The plurality of sets of PUCCH resources may be configured to indicate one or more PUCCH resource clusters. A PUCCH resource cluster may indicate one or more PUCCH resources. The BS 110 may configure a PUCCH resource cluster to indicate the first PUCCH resource and the second PUCCH resource.

In some aspects, the BS 110 may configure a PUCCH resource such that the PUCCH resource starts in a first slot (e.g., indicated by the starting symbol parameter) and ends in a second slot (e.g., indicated by the length parameter). For example, the BS 110 may configure a PUCCH resource with a starting symbol parameter indicating a $9^{th}$ symbol in the first slot and a length parameter indicating a length of 12 symbols, such that, assuming each slot includes 14 symbols, the PUCCH resource starts at the 8$^{th}$ symbol of the first slot and ends at the 6$^{th}$ symbol of the second slot.

In some aspects, the BS 110 may determine a quantity of symbols of the PUCCH resource in the first slot and a quantity of symbols of the PUCCH resource in the second slot. The BS 110 may determine that the quantity of symbols in the first slot and the quantity of symbols in the second slot both satisfy a threshold quantity of symbols. In some aspects, if the quantity of symbols in the first slot and the quantity of symbols in the second slot do not satisfy a threshold quantity of symbols, the BS 110 may not configure the PUCCH resource (or may change one or more PUCCH resource parameters associated with the PUCCH resource). The threshold quantity of symbols may be based at least in part on a PUCCH format associated with the PUCCH resource. For example, if the PUCCH format indicates the minimum number of symbols of the PUCCH resource is 4 symbols, the threshold quantity of symbols may be 4 symbols. For example, if the minimum number of symbols of the PUCCH resource is 4 symbols and the length of the PUCCH resource is greater than 14 symbols (e.g., assuming each slot includes 14 symbols), the BS 110 may determine that the length of the PUCCH resource should be greater than 17 symbols (e.g., ensuring that even if the PUCCH resource starts at the first symbol of a first slot, the quantity of symbols in a second slot will be at least 4 symbols).

In some aspects, the threshold quantity of symbols for the quantity of symbols in the first slot and the threshold quantity of symbols for the quantity of symbols in the second slot may be the same. In some aspects, the threshold quantity of symbols for the quantity of symbols in the first slot and the threshold quantity of symbols for the quantity of symbols in the second slot may be the different (e.g., such that the PUCCH resource is configured with a first PUCCH format in the first slot and a second PUCCH format in the second slot).

In some aspects, the BS 110 may configure a PUCCH resource in a first slot (e.g., indicated by a starting symbol parameter and a length parameter) with a number of repetitions (e.g., indicated by a number of repetitions parameter). Each repetition of the PUCCH may have the same length as the PUCCH resource and may start directly after the previous repetition ends. In some aspects, one or more repetitions may be configured to have a different length than the PUCCH resource. In some aspects, the PUCCH resource may be configured such that there is a time gap between each repetition of the PUCCH resource (e.g., a number of symbols between each repetition). The PUCCH resource and the repetitions of the PUCCH resource may be configured as a single PUCCH resource. For example, the BS 110 may configure a PUCCH resource such that the PUCCH resource has a length of 5 symbols, occupies the last 5 symbols of a first slot, and has 3 repetitions. The configuration of the PUCCH resource may indicate that a second repetition of the PUCCH resource starts in the first symbol of a second slot and has a length of 5 symbols (e.g., occupies symbols 1-5 of the second slot). The configuration of the PUCCH resource may indicate that a third repetition of the PUCCH resource starts at the 6$^{th}$ symbol of the second slot and has a length of 5 symbols (e.g., occupies symbols 6-10 of the second slot). In some aspects, the BS 110 may configure the PUCCH resource such that the PUCCH resource ends at the last symbol of a first slot (e.g., such that a next repetition of the PUCCH resource starts at the first symbol of a second slot). In some aspects, the BS 110 may configure the PUCCH resource such that the PUCCH resource and/or a repetition of the PUCCH resource crosses a boundary between the first slot and the second slot. In that case, the BS 110 may configure the PUCCH resource and/or the repetition of the PUCCH resource in a similar manner as described above.

As shown by reference number 410, the BS 110 may transmit an indication of the one or more PUCCH resource configurations. The BS 110 may transmit the indication of the one or more PUCCH resource configurations using an RRC protocol. The indication of the one or more PUCCH resource configurations may include one or more PUCCH resource parameters of the PUCCH resources. The indication of the one or more PUCCH resource configurations may be included in an RRC configuration.

As shown by reference number 415, the BS 110 may determine one or more PUCCH resources, of the configured PUCCH resources, to be used by the UE 120 for multiple repetitions of an uplink control information (UCI) transmission in multiple slots. For example, the UCI transmission may be scheduled by a downlink communication (e.g., scheduled by downlink control information (DCI) indicated in a downlink communication). For example, the UCI transmission may be a channel state information (CSI) transmission, a hybrid automatic repeat request acknowledgement (HARQ-ACK) transmission, a scheduling request (SR) transmission, and/or the like. In some aspects, the UCI transmission may occur periodically (e.g., without being scheduled by a downlink communication). In that case, the one or more PUCCH resources to be used by the UE 120 for multiple repetitions of the UCI transmission in multiple slots may be indicated in an RRC configuration.

As shown by reference number 420, the BS 110 may transmit an indication of the one or more PUCCH resources. The indication of the one or more PUCCH resources may enable the UE 120 to transmit multiple repetitions of a UCI transmission using one or more of the PUCCH resources, or one or more other resources (e.g., if the UE 120 performs any multiplexing, as described herein), in the multiple slots using different time domain resources in each slot. In some aspects, the one or more other resources may be one or more other sets of time domain resources, one or more other PUCCH resources, and/or the like. In some aspects, the indication of the one or more PUCCH resources may be included in a downlink communication that schedules the multiple repetitions of the UCI transmissions. For example, a DCI that schedules PDSCH (e.g. DCI formats 1_0, 1_1, 1_2) can also schedule HARQ-ACK transmission for acknowledgment of the scheduled PDSCH. In some aspects, the indication of the one or more PUCCH resources may be indicated in an RRC configuration (e.g., in the case of a periodic uplink communication).

In some aspects, the downlink communication that includes the indication of the one or more PUCCH resources and schedules the UCI transmission may include a timing indicator, a PUCCH resource indicator (PRI), and/or the like. In some aspects, the downlink communication may be associated with a control resource set (CORESET). The CORESET may include a quantity of control channel element indexes.

As shown by reference number 425, the UE 120 may determine one or more PUCCH resources to be used for multiple repetitions of a UCI transmission in multiple slots based at least in part on the indication of the one or more PUCCH resources received from the BS 110. For example, the UE 120 may determine respective sets of time domain resources (e.g., of one or more PUCCH resources) that are to be used for multiple repetitions of a UCI transmission in multiple slots.

In some aspects, the UE 120 may determine the one or more PUCCH resources to be used for multiple repetitions of a UCI transmission in multiple slots based at least in part on a payload size of the UCI transmission. For example, the UE 120 may compare the payload size of the UCI transmission to a maximum payload size associated with one or more of sets of PUCCH resources. In some aspects, the payload size of the UCI transmission may be the payload size of the UCI transmission after the UE 120 performs a multiplexing operation, as described below.

In some aspects, the UE 120 may determine the one or more PUCCH resources included in the set of PUCCH resources based at least in part on the PUCCH resource indicator (PRI) received in the downlink communication that scheduled the UCI transmission. In some aspects, the PRI may be capable of indicating the same quantity of values as the quantity of PUCCH resources indicated by the set of PUCCH resources. For example, the set of PUCCH resources may indicate 8 PUCCH resources. The size of the PRI may be 3 bits, such that the PRI is capable of indicating 8 values. In that case, the UE 120 may determine the one or more PUCCH resources based at least in part on the PRI value.

In some aspects, the set of PUCCH resources may indicate a higher quantity of PUCCH resources than the quantity of values the PRI is capable of indicating (e.g., the set of PUCCH resources may indicate 32 PUCCH resources and the PRI may be capable of indicating 8 values). In that case, the UE 120 may identify the one or more PUCCH resources based at least in part on at least one of the PRI value, a first control channel element (CCE) index of the downlink communication indicating the PRI, or the quantity of CCEs included in the CORESET in which the downlink communication indicating the PRI is received by the UE 120. For example, the one or more PUCCH resources may be derived using an equation that utilizes the PRI value, the first CCE index of the downlink communication, and/or the quantity of CCEs included in the CORESET, such as an equation that utilizes the PRI value, the first CCE index of the downlink communication, and the quantity of CCEs included in the CORESET.

In some aspects, the downlink communication that schedules the UCI transmission may include multiple PRI values indicating multiple PUCCH resources for the multiple repetitions of the UCI transmission in multiple slots. In some aspects, the downlink communication that schedules the UCI transmission may include one PRI value indicating multiple PUCCH resources for the multiple repetitions of the UCI transmission in multiple slots. In some aspects, the downlink communication that schedules the UCI transmission may include one PRI value indicating a first PUCCH resource in a first slot for one repetition of the UCI transmission. The UE 120 may determine a second PUCCH resource in a second slot for a second repetition of the UCI transmission based at least in part on the first PUCCH resource and the second PUCCH resource being linked together (e.g., as indicated in a configuration of the PUCCH resources). The UE 120 may determine that the second PUCCH resource is in the second slot based at least in part on determining the first PUCCH resource is in the first slot and based at least in part on determining that the second slot is a next slot after the first slot.

In some aspects, the UE 120 may determine that a PUCCH resource indicated in the downlink communication that schedules the UCI transmission is configured such that the PUCCH resource starts in a first slot and ends in a second slot (e.g., based at least in part on one or more PUCCH resource parameters). In that case, the UE 120 may determine that the PUCCH resource should be associated with multiple repetitions of the UCI transmission. For example, the UE 120 may determine that a set of time domain resources for a first repetition of the UCI transmission should start at the start of the PUCCH resource and end at the end of the first slot. The UE 120 may determine that a set of time domain resources for a second repetition of the UCI transmission should start at the start of the second slot and end at the end of the PUCCH resource.

In some aspects, the UE 120 may determine that a PUCCH resource indicated in the downlink communication that schedules the UCI transmission is configured with one or more repetitions of the PUCCH resource. In that case, the UE 120 may determine that the PUCCH resource should be associated with multiple repetitions of the UCI transmission corresponding to the multiple repetitions of the PUCCH resource. For example, the UE 120 may determine that a set of time domain resources for a first repetition of the UCI transmission should correspond to the PUCCH resource indicated in the downlink communication. The UE 120 may determine that a set of time domain resources for a second repetition of the UCI transmission should correspond to a first repetition of the PUCCH resource.

In some aspects, the UE 120 may determine that each repetition of the UCI transmission includes a separate demodulation reference signal symbol. In some aspects, the UE 120 may perform rate matching for each repetition of the UCI transmission based at least in part on associated resources of each repetition. In some aspects, the UE 120 may map UCI coded bits to one or more PUCCH resource elements for each repetition of the UCI transmission based at least in part on associated resources of each repetition. In some aspects, the UE 120 may determine a power control (e.g., for determining a transmit power of the UCI transmission) for each repetition of the UCI transmission (e.g., based at least in part on one or more transmit power control (TPC) commands received in the downlink communication that schedules the UCI transmission).

In some aspects, the UE 120 may determine that each repetition of the UCI transmission is to be transmitted on a same beam or on a same frequency hop. In some aspects, the UE 120 may determine that one or more repetitions of the UCI transmission is to be transmitted on a different beam or on a different frequency hop. For example, the UE 120 may determine that the UE 120 is to perform inter-repetition beam hopping (e.g., transmit a first repetition on a first beam, transmit a next repetition on a second beam, transmit a next repetition on the first beam, and/or the like). In some aspects, the UE 120 may determine that the UE 120 is to perform inter-slot beam hopping (e.g., transmit all repetitions in a first slot on a first beam, transmit all repetitions in a next slot on a second beam, and/or the like).

As shown by reference number 430, the UE 120 may determine whether to drop one or more of the multiple repetitions of the UCI transmission based at least in part on a determination that one or more of the PUCCH resources associated with the repetitions of the UCI transmission overlaps in a time domain with at least one other PUCCH resource of a different uplink communication. The UE 120 may determine whether to drop one or more of the multiple repetitions of the UCI transmission (or one or more different uplink communications) on a per slot basis and/or on a per repetition basis. For example, the UE 120 may determine a priority associated with each type of UCI transmission the UE 120 is capable of transmitting. In some aspects, the priority of UCI transmission types may be (from highest priority to lowest priority): HARQ-ACK>SR>CSI. In some aspects, CSI communications may include higher priority CSI communications and lower priority CSI communications. In that case, the priority of UCI transmission types may be (from highest priority to lowest priority): HARQ-ACK>SR>higher priority CSI>lower priority CSI.

In some aspects, the UE 120 may determine whether to drop one or more repetitions of the UCI transmission based at least in part on comparing UCI transmission type of the UCI transmission to the UCI transmission type of the different uplink communication. In some aspects, the UE 120 may drop the uplink communication (e.g., the uplink communication or the different uplink communication) with the lower priority UCI transmission type. For example, if the repetitions of the UCI transmission are SR transmissions and the different uplink communication is a HARQ-ACK communication, the UE 120 may drop the repetitions of the UCI transmission that overlap in the time domain with the at least one PUCCH resource of the different uplink communication (e.g., may drop the SR transmissions that overlap with the HARQ-ACK communication). In some aspects, if one or more repetitions of the UCI transmission do not overlap in the time domain with the at least one other PUCCH resource of the different uplink communication, the UE 120 may not drop the non-overlapping repetitions of the UCI transmission.

In some aspects, the UE 120 may determine that the UCI transmission and the different uplink communication have the same UCI transmission type. In that case, the UE 120 may compare a starting time of one or more of the multiple repetitions of the UCI transmission to a starting time of the different uplink communication. The starting time of the one or more of the multiple repetitions of the UCI transmission may be determined based at least in part on the starting time of the repetition that overlaps with the different uplink communication or based at least in part on the starting time of the first repetition of the multiple repetitions of the UCI transmission. In some aspects, the UE 120 may drop the uplink communication (e.g., the UCI transmission or the different uplink communication) with the later starting time.

In some aspects, when the UCI transmission and the different uplink communication have the same UCI transmission type, the UE 120 may compare a quantity of repetitions of the multiple repetitions of the UCI transmission in a slot to a quantity of repetitions of the different uplink communication in the same slot. In some aspects, the quantity of repetitions of the multiple repetitions of the UCI transmission may be a total quantity of repetitions or a quantity of repetitions that overlap with the different uplink communication in the time domain. In some aspects, the UE 120 may drop the uplink communication (e.g., the UCI transmission or the different uplink communication) with the greater quantity of repetitions in the slot. In some aspects, the UE 120 may drop the uplink communication (e.g., the UCI transmission or the different uplink communication) with the lower quantity of repetitions in the slot.

In some aspects, the UE 120 may determine that one or more of the PUCCH resources for the multiple repetitions of the UCI transmission overlap in a time domain with at least one physical uplink shared channel (PUSCH) resource of an associated different uplink communication. The UE 120 may drop the different uplink communication based at least in part on determining that one or more of the PUCCH resources for the multiple repetitions of the UCI transmission overlap in the time domain with the at least one PUSCH resource.

As shown by reference number 435, the UE 120 may determine whether to multiplex any uplink communications. In some aspects, the UE 120 may determine whether to multiplex any uplink communications on a per slot basis (e.g., a repetition of a UCI transmission in a first slot may not impact the determination of whether to multiplex any uplink communications in a second slot). In some aspects, the UE 120 may treat all slots that include a repetition of the UCI transmission as a single slot for the purposes of determining whether to multiplex any uplink communications.

For example, the UE 120 may determine whether to multiplex one or more of the repetitions of the UCI transmission with one or more different uplink communications, based at least in part on a determination that the one or more different uplink communications are scheduled in one or more resources that overlap in a time domain with at least one of the PUCCH resources for the repetitions of the UCI transmission. In some aspects, the UE 120 may determine that the one or more resources that overlap in the time domain with at least one of the PUCCH resources for the repetitions of the UCI transmission are one or more other PUCCH resources. The UE 120 may multiplex the UCI transmission with the one or more different uplink communications based at least in part on determining that the one or more resources that overlap in the time domain with at least one of the PUCCH resources for the repetitions of the UCI transmission are one or more other PUCCH resources. As a result, all repetitions of the UCI transmission may include the payload of the UCI transmission and the different uplink communication (e.g., may include a UCI of the UCI transmission and a UCI of the different uplink communication). The UE 120 may determine new PUCCH resources (which may or may not be the same as the one or more PUCCH resources originally identified) using the new payload size of the multiplexed PUCCH communication in a similar manner as described above (e.g., by identifying a PUCCH resource from an identified set of PUCCH resources).

In some aspects, the UE 120 may determine that the one or more resources that overlap in a time domain with at least one of the PUCCH resources for the repetitions of the UCI transmission are one or more resources for a PUSCH transmission. In some aspects, the UE 120 may determine that the PUSCH transmission includes multiple PUSCH repetitions. In some aspects, the UE 120 may multiplex the UCI transmission (e.g., all repetitions of the UCI transmission) with the multiple PUSCH repetitions based at least in part on determining that the PUSCH transmission includes multiple PUSCH repetitions. In some aspects, the UE 120 may multiplex the UCI transmission with the one or more PUSCH repetitions that overlap in the time domain with at least one of the PUCCH resources based at least in part on determining that the PUSCH transmission includes multiple PUSCH repetitions (e.g., such that only the overlapping PUSCH transmission includes the payload of the UCI transmission).

In some aspects, the UE 120 may drop the one or more of the repetitions of the UCI transmission (e.g., all repetitions of the UCI transmission) based at least in part on determining that the PUSCH transmission includes multiple PUSCH repetitions. In some aspects, the UE 120 may drop the one or more repetitions of the UCI transmission associated with a PUCCH resource that overlaps in the time domain with the one or more PUSCH repetitions based at least in part on determining that the PUSCH transmission includes multiple PUSCH repetitions.

As shown by reference number 440, the UE 120 may transmit, to the BS 110, one or more repetitions of the UCI transmission in multiple slots using different time domain resources in each slot and/or one or more multiplexed uplink communications. For example, the UE 120 may transmit the one or more repetitions of the UCI transmission in multiple slots after determining whether to drop or multiplex one or more of the repetitions. In some aspects, the UE 120 may transmit one or more of the repetitions of the UCI transmission using different beams and/or using different frequency hops. In some aspects, the UE 120 may transmit the one or more repetitions of the UCI transmission in multiple slots using resources that are different than the one or more PUCCH resources indicated in the downlink communication that scheduled the UCI transmission (e.g., after performing a multiplexing operation).

As indicated above, FIG. 4 is provided as an example. Other examples may differ from what is described with respect to FIG. 4.

Figure 5:
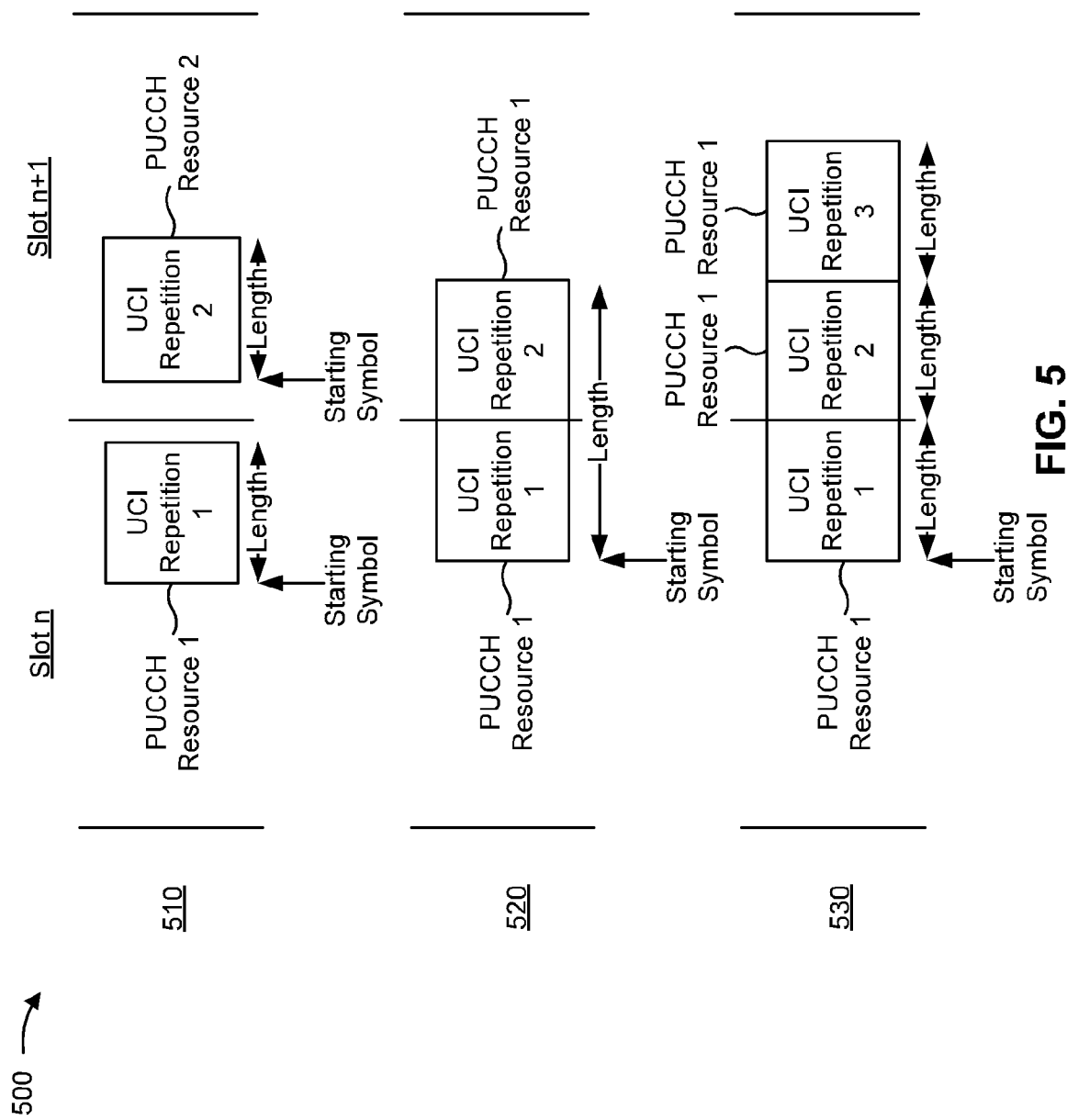
FIG. 5 is a diagram illustrating examples of uplink control communication repetition in multiple slots using different sets of time domain resources, in accordance with various aspects of the present disclosure.

FIG. 5 is a diagram illustrating examples of uplink control communication repetition in multiple slots using different sets of time domain resources, in accordance with various aspects of the present disclosure. As shown, a transmission timeline for an uplink may include one or more slots (e.g., slot n, slot n+1, and/or the like), such as a first set of slots (e.g., slots 510), a second set of slots (e.g., slots 520), and a third set of slots (e.g., slots 530). Slots 510, slots 520, and/or slots 530 may be different slots in the same transmission timeline for an uplink. In some aspects, slots 510, slots 520, and/or slots 530 may represent the same set of slots in different transmission timelines for an uplink. A block in slots 510, slots 520, and/or slots 530 may represent one resource (e.g., a PUCCH resource, a resource for a PUSCH transmission, and/or the like).

As shown, a UE (e.g., UE 120) may determine respective sets of time domain resources that are to be used for multiple repetitions of an uplink control information (UCI) transmission in multiple slots (e.g., slot n and slot n+1). In some aspects, slot n and slot n+1 are consecutive slots in the same transmission timeline. Slots 510, slots 520, and slots 530 are provided merely as examples. Other slots may include additional uplink communication resources, fewer uplink communication resources, different uplink communication resources, and/or the like.

As shown by slots 510, the UE 120 may determine two PUCCH resources (e.g., PUCCH resource 1 and PUCCH resource 2) for two repetitions of a UCI transmission. PUCCH resource 1 and/or PUCCH resource 2 may be configured with a starting symbol (e.g., indicated by a starting symbol parameter) and a length (e.g., indicated by a length parameter). In some aspects, the length of PUCCH resource 1 and the length of PUCCH resource 2 are the same. In some aspects, the length of PUCCH resource 1 and the length of PUCCH resource 2 are different. In some aspects, the set of time domain resources that PUCCH resource 1 occupies in slot n may be different from the set of time domain resources that PUCCH resource 2 occupies in slot n+1. For example, PUCCH resource 1 may occupy symbols 8-12 of slot n. PUCCH resource 2 may occupy symbols 2-6 of slot n+1.

In some aspects, PUCCH resource 1 and PUCCH resource 2 may be linked (e.g., in a resource cluster and/or the like). The UE 120 may determine that PUCCH resource 1 and PUCCH resource 2 are linked based at least in part on a configuration of the PUCCH resources. In some aspects, a downlink communication that schedules the UCI transmission may indicate both PUCCH resource 1 and PUCCH resource 2. In some aspects, a downlink communication that schedules the UCI transmission may indicate only one of PUCCH resource 1 or PUCCH resource 2 and the UE 120 may determine the other one of PUCCH resource 1 or PUCCH resource 2 based at least in part on the linking indicated in the configuration of the PUCCH resources. In some aspects, a downlink communication that schedules the UCI transmission may indicate whether PUCCH resource 1 and PUCCH resource 2 correspond to the same slot or consecutive slots.

As shown by slots 520, the UE 120 may determine one PUCCH resource (e.g., PUCCH resource 1) for two repetitions of a UCI transmission in consecutive slots (e.g., slot n and slot n+1). The UE 120 may determine that PUCCH resource 1 is configured with a starting symbol (e.g., indicated by a starting symbol parameter) and a length (e.g., indication by a length parameter) such that the PUCCH resource 1 starts in slot n and ends in slot n+1. The UE 120 may determine that PUCCH resource 1 is to be used for multiple repetitions of the UCI transmissions based at least in part on determining that PUCCH resource 1 is configured such that PUCCH resource 1 crosses a slot boundary. In some aspects, the UE 120 may determine that PUCCH resource 1 is to be used for multiple repetitions of the UCI transmissions based at least in part on an indication in the downlink communication that schedules the UCI transmission. In some aspects, the UE 120 may determine that a first repetition of the UCI transmission is to occur in slot n and a second repetition of the UCI transmission is to occur in slot n+1 based at least in part on the configuration of PUCCH resource 1. For example, the UE 120 may determine that a first repetition of the UCI transmission should use time domain resources of PUCCH resource 1 from the start of PUCCH resource 1 until the end of slot n. The UE 120 may determine that a second repetition of the UCI transmission should use time domain resources of PUCCH resource 1 from the start of slot n+1 until the end of PUCCH resource 1.

As shown by slots 530, the UE 120 may determine one PUCCH resource (e.g., PUCCH resource 1) for three repetitions of a UCI transmission in consecutive slots (e.g., slot n and slot n+1). The UE 120 may determine that PUCCH resource 1 is be configured with a starting symbol (e.g., indicated by a starting symbol parameter), a length (e.g., indicated by a length parameter), and a number of repetitions (e.g., 3, indicated by a number of repetitions parameter). In some aspects, the starting symbol may be a starting symbol of the first repetition of the UCI transmission and the length may be a length of the first repetition of the UCI transmission. In some aspects, the UE 120 may determine that all repetitions (e.g., indicated by the number of repetitions parameter) have the same length as the first repetition and occur consecutively after the first repetition in the time domain. For example, the UE 120 may determine that PUCCH resource 1 is configured with a starting symbol of the $11^{th}$ symbol of slot n, a length of 4 symbols, and a number of repetitions of 3 repetitions. Assuming slot n has 14 symbols, the UE 120 may determine that the first repetition of PUCCH resource 1 occupies the last 4 symbols of slot n (e.g., the $11^{th}$ symbol through the $14^{th}$ symbol). The UE 120 may determine that the second repetition of PUCCH resource 1 occupies the first 4 symbols of slot n+1 (e.g., the $1^{st}$ symbol through the $4^{th}$ symbol). The UE 120 may determine that the third repetition of PUCCH resource 1 occupies the next 4 symbols of slot n+1 after the second repetition of PUCCH resource 1 (e.g., the $5^{th}$ symbol through the $8^{th}$ symbol). The UE 120 may determine that a first repetition of the UCI transmission should use time domain resources of the first repetition of PUCCH resource 1. The UE 120 may determine that a second repetition of the UCI transmission should use time domain resources of the second repetition of PUCCH resource 1. The UE 120 may determine that a third repetition of the UCI transmission should use time domain resources of the third repetition of PUCCH resource 1. In some aspects, the UE 120 may determine that a repetition of PUCCH resource 1 crosses a slot boundary between slot n and slot n+1. In that case, the UE 120 may treat the repetition that crosses the slot boundary as described above with respect to FIG. 4 and/or with respect to slots 520.

As indicated above, FIG. 5 is provided as examples. Other examples may differ from what is described with respect to FIG. 5.

Figure 6:
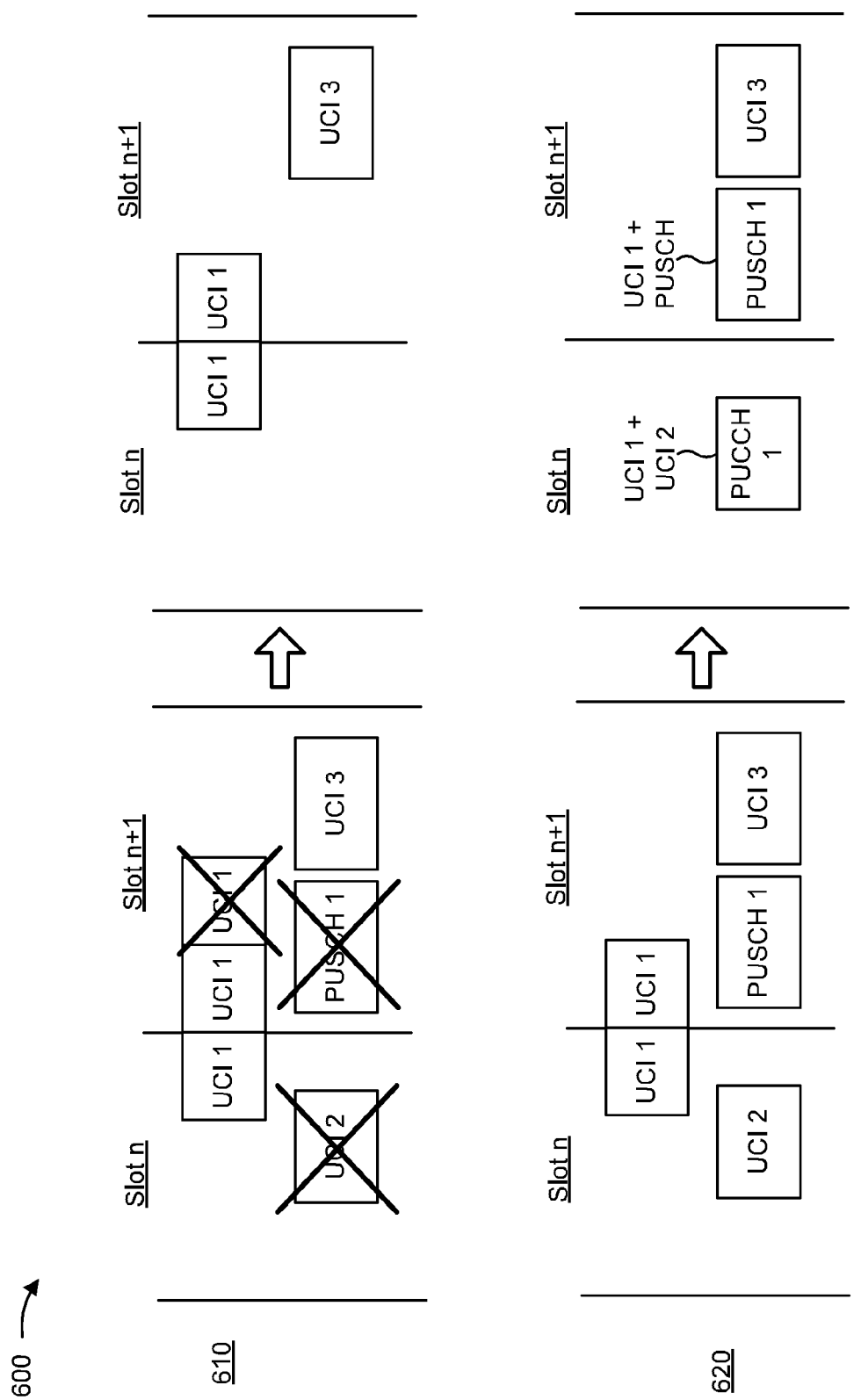
FIG. 6 is a diagram illustrating examples of uplink control communication repetition in multiple slots using different sets of time domain resources, in accordance with various aspects of the present disclosure.

FIG. 6 is a diagram illustrating examples of uplink control communication repetition in multiple slots using different sets of time domain resources, in accordance with various aspects of the present disclosure. As shown, a transmission timeline for an uplink may include one or more slots (e.g., slot n, slot n+1, and/or the like), such as a first set of slots (e.g., slots 610) and a second set of slots (e.g., slots 620). Slots 610 and/or slots 620 may be different slots in the same transmission timeline for an uplink. In some aspects, slots 610 and/or slots 620 may represent the same set of slots in different transmission timelines for an uplink. A block in slots 610 and/or slots 620 may represent one resource (e.g., a PUCCH resource, a resource for a PUSCH transmission, and/or the like). Slots 610 and slots 620 are provided merely as examples. Other slots may include additional uplink communications, fewer uplink communications, different uplink communications, and/or the like.

As shown in slots 610, a user equipment (e.g., UE 120) may compare the UCI transmission types of the uplink communications in each slot (e.g., slot n and/or slot n+1) to determine which (if any) uplink communications to drop. In some aspects, the UE 120 may determine which (if any) uplink communications to drop in a similar manner as described above with respect to FIG. 4.

For example, the UE 120 may determine one PUCCH resource to be used for three repetitions of a UCI transmission (e.g., UCI 1) in consecutive slots (e.g., slot n and slot n+1). The UE 120 may determine that UCI 1 is an SR transmission. The UE 120 may identify another PUCCH resource to be used for another UCI transmission (e.g., UCI 2) in slot n. The UE 120 may determine that UCI 2 is a CSI transmission. The UE 120 may identify resources to be used for a PUSCH communication (e.g., PUSCH 1) in slot n+1. The UE 120 may identify another PUCCH resource to be used for another UCI transmission (e.g., UCI 3) in slot n+1. The UE 120 may determine that UCI 3 is a HARQ-ACK transmission. The UE 120 may determine which (if any) uplink communications to drop on a per slot basis (e.g., may determine which (if any) uplink communication to drop in slot n and determine which (if any) uplink communication to drop in slot n+1). In some aspects, the UE 120 may determine which (if any) uplink communications to drop on a per repetition basis.

For example, the UE 120 may determine that UCI 2 should be dropped based at least in part on determining that PUCCH resources of UCI 2 overlap in the time domain with PUCCH resources of the first repetition of UCI 1 and based at least in part on determining that the UCI transmission type of UCI 1 (e.g., SR) has a higher priority than the UCI transmission type of UCI 2 (e.g., CSI). The UE 120 may determine that PUSCH 1 should be dropped based at least in part on determining that resources of PUSCH 1 overlap in the time domain with PUCCH resources of the first repetition of UCI 1 and based at least in part on determining that the overlapping resources are to be used for a PUSCH transmission. The UE 120 may determine that the third repetition of UCI 1 should be dropped based at least in part on determining that PUCCH resources of UCI 3 overlap in the time domain with PUCCH resources of the third repetition of UCI 1 and based at least in part on determining that the UCI transmission type of UCI 3 (e.g., HARQ-ACK) has a higher priority than the UCI transmission type of UCI 1 (e.g., SR). As a result, the UE 120, after determining which uplink communications should be dropped, may transmit the first repetition of UCI 1 in slot n. The UE 120 may transmit the second repetition of UCI 1 and UCI 3 in slot n+1 (e.g., as shown after the top arrow in FIG. 6).

As shown by slots 620, the UE 120 may determine whether resources of different uplink communications in each slot overlap in a time domain to determine which (if any) uplink communications to multiplex. In some aspects, the UE 120 may determine which (if any) uplink communications to multiplex in a similar manner as described above with respect to FIG. 4 In some aspects, the UE 120 may determine which (if any) uplink communications to multiplex on a per slot basis (e.g., determine which (if any) uplink communications to multiplex in slot n and determine which (if any) uplink communications to multiplex in slot n+1). In some aspects, the UE 120 may treat all slots that include a repetition of the UCI transmission as a single slot for the purposes of determining which (if any) uplink communications to multiplex (e.g., the UE 120 may treat slot n and slot n+1 as one slot).

For example, the UE 120 may determine one PUCCH resource to be used for two repetitions of a UCI transmission (e.g., UCI 1) in consecutive slots (e.g., slot n and slot n+1). The UE 120 may identify another PUCCH resource to be used for another UCI transmission (e.g., UCI 2) in slot n. The UE 120 may identify resources to be used for a PUSCH communication (e.g., PUSCH 1) in slot n+1. The UE 120 may identify another PUCCH resource to be used for another UCI transmission (e.g., UCI 3) in slot n+1. The UE 120 may determine that the first repetition of UCI 1 and UCI 2 should be multiplexed based at least in part on determining that PUCCH resources of UCI 2 overlap in the time domain with PUCCH resources of the first repetition of UCI 1 in slot n. The UE 120 may determine that the second repetition of UCI 1 and PUSCH 1 should be multiplexed based at least in part on determining that the resources of PUSCH 1 overlap in the time domain with PUCCH resources of the second repetition of UCI 1 in slot n+1. The UE 120 may determine that UCI 3 should not be multiplexed with any other uplink communication based at least in part on determining that the PUCCH resources of UCI 3 do not overlap in the time domain with any other resources of another uplink communication. As a result, the UE 120, after determining which uplink communications should be multiplexed (and multiplexing the uplink communications) may transmit the first repetitions of UCI 1 and UCI 2 in a first PUCCH transmission (e.g., PUCCH 1) in slot n. The UE 120 may transmit the second repetition of UCI 1 and PUSCH 1 in a PUSCH transmission in slot n+1. The UE 120 may transmit UCI 3 using the PUCCH resources originally identified in slot n+1 (e.g., as shown after the bottom arrow in FIG. 6). In some aspects, the resources of the multiplexed uplink communications may be the same as originally identified. In some aspects, the UE 120 may determine different PUCCH resources for the multiplexed uplink communications based at least in part on the new payload of the uplink communications (e.g., the multiplexed payload of the uplink communications).

As indicated above, FIG. 6 is provided as examples. Other examples may differ from what is described with respect to FIG. 6.

Figure 7:
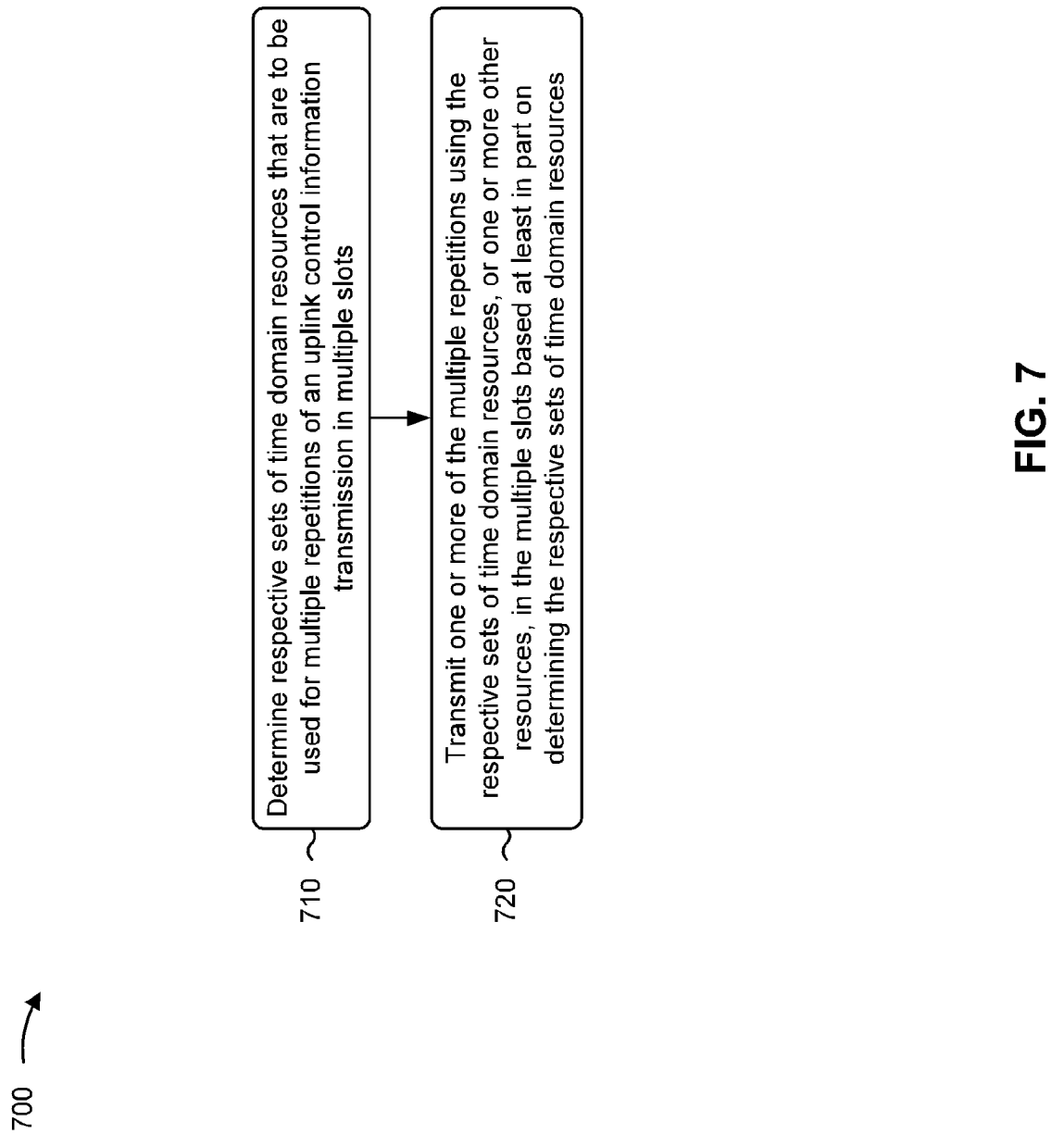
FIG. 7 is a diagram illustrating an example process performed, for example, by a user equipment, in accordance with various aspects of the present disclosure.

FIG. 7 is a diagram illustrating an example process 700 performed, for example, by a user equipment, in accordance with various aspects of the present disclosure. Example process 700 is an example where the user equipment (e.g., user equipment 120 and/or the like) performs operations associated with uplink control communication repetition in multiple slots using different sets of time domain resources.

As shown in FIG. 7, in some aspects, process 700 may include determining respective sets of time domain resources that are to be used for multiple repetitions of an uplink control information transmission in multiple slots (block 710). For example, the user equipment (e.g., using receive processor 258, transmit processor 264, controller/processor 280, memory 282, and/or the like) may determine respective sets of time domain resources that are to be used for multiple repetitions of an uplink control information transmission in multiple slots, as described above.

As further shown in FIG. 7, in some aspects, process 700 may include transmitting one or more of the multiple repetitions using the respective sets of time domain resources, or one or more other resources, in the multiple slots based at least in part on determining the respective sets of time domain resources (block 720). For example, the user equipment (e.g., using receive processor 258, transmit processor 264, controller/processor 280, memory 282, and/or the like) may transmit one or more of the multiple repetitions using the respective sets of time domain resources, or one or more other resources, in the multiple slots based at least in part on determining the respective sets of time domain resources, as described above.

Process 700 may include additional aspects, such as any single aspect or any combination of aspects described below and/or in connection with one or more other processes described elsewhere herein.

In a first aspect, the multiple slots are consecutive slots.

In a second aspect, alone or in combination with the first aspect, a first set of time domain resources for a first repetition of the uplink control information transmission occupies a first set of symbols in a first slot, and a second set of time domain resources for a second repetition of the uplink control information transmission occupies a second set of symbols in a second slot.

In a third aspect, alone or in combination with one or more of the first and second aspects, a last symbol of the first set of symbols is a last symbol in the first slot and a first symbol of the second set of symbols is a first symbol in the second slot.

In a fourth aspect, alone or in combination with one or more of the first through third aspects, process 700 includes identifying one or more physical uplink control channel (PUCCH) resource parameters based at least in part on an indication of the one or more PUCCH resource parameters, wherein determining the respective sets of time domain resources is based at least in part on identifying the one or more PUCCH resource parameters.

In a fifth aspect, alone or in combination with one or more of the first through fourth aspects, the one or more PUCCH resource parameters include at least one of: a starting symbol parameter; a length parameter; or a number of repetitions parameter.

In a sixth aspect, alone or in combination with one or more of the first through fifth aspects, process 700 includes determining multiple PUCCH resources associated with the respective sets of time domain resources that are to be used for the multiple repetitions of the uplink control information transmission in multiple slots.

In a seventh aspect, alone or in combination with one or more of the first through sixth aspects, process 700 includes determining a first PUCCH resource of the multiple PUCCH resources based at least in part on a first indication received in a downlink communication; and determining a second PUCCH resource of the multiple PUCCH resources based at least in part on a second indication received in the downlink communication.

In an eighth aspect, alone or in combination with one or more of the first through seventh aspects, process 700 includes determining that a first PUCCH resource and a second PUCCH resource of the multiple PUCCH resources are linked based at least in part on an indication received in a downlink communication; determining the first PUCCH resource of the multiple PUCCH resources based at least in part on another indication; and determining the second PUCCH resource of the multiple PUCCH resources based at least in part on determining that the first PUCCH resource and the second PUCCH resource are linked.

In a ninth aspect, alone or in combination with one or more of the first through eighth aspects, process 700 includes determining, based at least in part on a first set of PUCCH resource parameters, a first set of time domain resources in a first slot for a first repetition of the uplink control information transmission; and determining, based at least in part on a second set of PUCCH resource parameters, a second set of time domain resources in a second slot for a second repetition of the uplink control information transmission.

In a tenth aspect, alone or in combination with one or more of the first through ninth aspects, process 700 includes determining the first slot based at least in part on an indication received in a downlink communication; and determining the second slot based at least in part on determining the first slot.

In an eleventh aspect, alone or in combination with one or more of the first through tenth aspects, process 700 includes determining a PUCCH resource associated with the respective sets of time domain resources that is to be used for the multiple repetitions of the uplink control information transmission in multiple slots.

In a twelfth aspect, alone or in combination with one or more of the first through eleventh aspects, process 700 includes determining a starting symbol and an ending symbol of the PUCCH resource based at least in part on a set of PUCCH resource parameters, wherein the starting symbol is in a first slot and the ending symbol is in a second slot; determining a first set of time domain resources of the respective sets of time domain resources based at least in part on the starting symbol and a slot boundary between the first slot and the second slot; and determining a second set of time domain resources of the respective sets of time domain resources based at least in part on the ending symbol and the slot boundary between the first slot and the second slot.

In a thirteenth aspect, alone or in combination with one or more of the first through twelfth aspects, process 700 includes determining a quantity of symbols of the PUCCH resource in the first slot and a quantity of symbols of the PUCCH resource in the second slot based at least in part on the set of PUCCH resource parameters; and determining that the quantity of symbols in the first slot and the quantity of symbols in the second slot both satisfy a threshold quantity of symbols, wherein determining the first set of time domain resources and determining the second set of time domain resources is based at least in part on determining that the quantity of symbols in the first slot and the quantity of symbols in the second slot both satisfy the threshold quantity of symbols.

In a fourteenth aspect, alone or in combination with one or more of the first through thirteenth aspects, process 700 includes transmitting a first repetition of the multiple repetitions of the uplink control information transmission using the first set of time domain resources; and transmitting a second repetition of the multiple repetitions of the uplink control information transmission using the second set of time domain resources.

In a fifteenth aspect, alone or in combination with one or more of the first through fourteenth aspects, process 700 includes determining a quantity of repetitions of the multiple repetitions of the uplink control information transmission based at least in part on one or more PUCCH resource parameters of the PUCCH resource.

In a sixteenth aspect, alone or in combination with one or more of the first through fifteenth aspects, process 700 includes determining the respective sets of time domain resources that are to be used for the multiple repetitions of the uplink control information transmission based at least in part on: determining the quantity of repetitions of the multiple repetitions; determining a starting symbol of a first repetition of the multiple repetitions based at least in part on the one or more PUCCH resource parameters of the PUCCH resource; and determining a length of each repetition of the multiple repetitions based at least in part on the one or more PUCCH resource parameters of the PUCCH resource.

In a seventeenth aspect, alone or in combination with one or more of the first through sixteenth aspects, process 700 includes determining that a set of time domain resources of the respective sets of time domain resources has a starting symbol in a first slot and an ending symbol in a second slot; determining a first set of time domain resources of the set of time domain resources based at least in part on the starting symbol and a slot boundary between the first slot and the second slot; and determining a second set of time domain resources of the set of time domain resources based at least in part on the ending symbol and the slot boundary between the first slot and the second slot.

In an eighteenth aspect, alone or in combination with one or more of the first through seventeenth aspects, each of the one or more of the multiple repetitions includes a demodulation reference signal symbol.

In a nineteenth aspect, alone or in combination with one or more of the first through eighteenth aspects, process 700 includes performing rate matching for each of the one or more of the multiple repetitions based at least in part on associated resources of each of the one or more of the multiple repetitions.

In a twentieth aspect, alone or in combination with one or more of the first through nineteenth aspects, process 700 includes determining a transmit power for each of the one or more of the multiple repetitions.

In a twenty-first aspect, alone or in combination with one or more of the first through twentieth aspects, transmitting one or more of the multiple repetitions using the respective sets of time domain resources, or one or more other resources, in the multiple slots comprises: transmitting a first repetition of the one or more of the multiple repetitions using a first beam, and transmitting a second repetition of the one or more of the multiple repetitions using a second beam.

In a twenty-second aspect, alone or in combination with one or more of the first through twenty first aspects, transmitting one or more of the multiple repetitions using the respective sets of time domain resources, or one or more other resources, in the multiple slots comprises: transmitting all repetitions of the one or more of the multiple repetitions in a first slot of the multiple slots using a first beam, and transmitting all repetitions of the one or more of the multiple repetitions in a second slot of the multiple slots using a second beam.

In a twenty-third aspect, alone or in combination with one or more of the first through twenty second aspects, process 700 includes determining that each of the one or more of the multiple repetitions are configured using a same format.

In a twenty-fourth aspect, alone or in combination with one or more of the first through twenty third aspects, process 700 includes determining that a first repetition of the one or more of the multiple repetitions is configured using a first format; and determining that a second repetition of the one or more of the multiple repetitions is configured using a second format.

In a twenty-fifth aspect, alone or in combination with one or more of the first through twenty fourth aspects, process 700 includes determining whether to drop one or more of the multiple repetitions of the uplink control information transmission in a slot of the multiple slots, or one or more different uplink communications in the slot of the multiple slots, based at least in part on a determination that the one or more different uplink communications are scheduled in one or more resources that overlap in a time domain with at least one of the respective sets of time domain resources that are to be used for multiple repetitions.

In a twenty-sixth aspect, alone or in combination with one or more of the first through twenty fifth aspects, a determination of whether to drop the one or more of the multiple repetitions or the one or more different uplink communications is with respect to a single repetition.

In a twenty-seventh aspect, alone or in combination with one or more of the first through twenty sixth aspects, process 700 includes comparing an uplink control information transmission type of the uplink control information transmission to an uplink control information transmission type of the one or more different uplink communications; and dropping the one or more of the multiple repetitions of the uplink control information transmission or the one or more different uplink communications based at least in part on comparing the uplink control information transmission types.

In a twenty-eighth aspect, alone or in combination with one or more of the first through twenty seventh aspects, process 700 includes determining that the one or more different uplink communications are physical uplink shared channel (PUSCH) communications; and dropping the one or more different uplink communications based at least in part on determining that the one or more different uplink communications are PUSCH communications.

In a twenty-ninth aspect, alone or in combination with one or more of the first through twenty eighth aspects, process 700 includes determining whether to multiplex one or more of the multiple repetitions with one or more different uplink communications, based at least in part on a determination that the one or more different uplink communications are scheduled in one or more resources that overlap in a time domain with at least one of the respective sets of time domain resources that are to be used for multiple repetitions.

In a thirtieth aspect, alone or in combination with one or more of the first through twenty ninth aspects, the determination of whether to multiplex the one or more of the multiple repetitions with the one or more different uplink communications is with respect to a single slot.

In a thirty-first aspect, alone or in combination with one or more of the first through thirtieth aspects, the determination of whether to multiplex the one or more of the multiple repetitions with the one or more different uplink communications is with respect to a single repetition.

In a thirty-second aspect, alone or in combination with one or more of the first through thirty first aspects, the determination of whether to multiplex the one or more of the multiple repetitions with the one or more different uplink communications is with respect to the multiple repetitions in consecutive slots.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
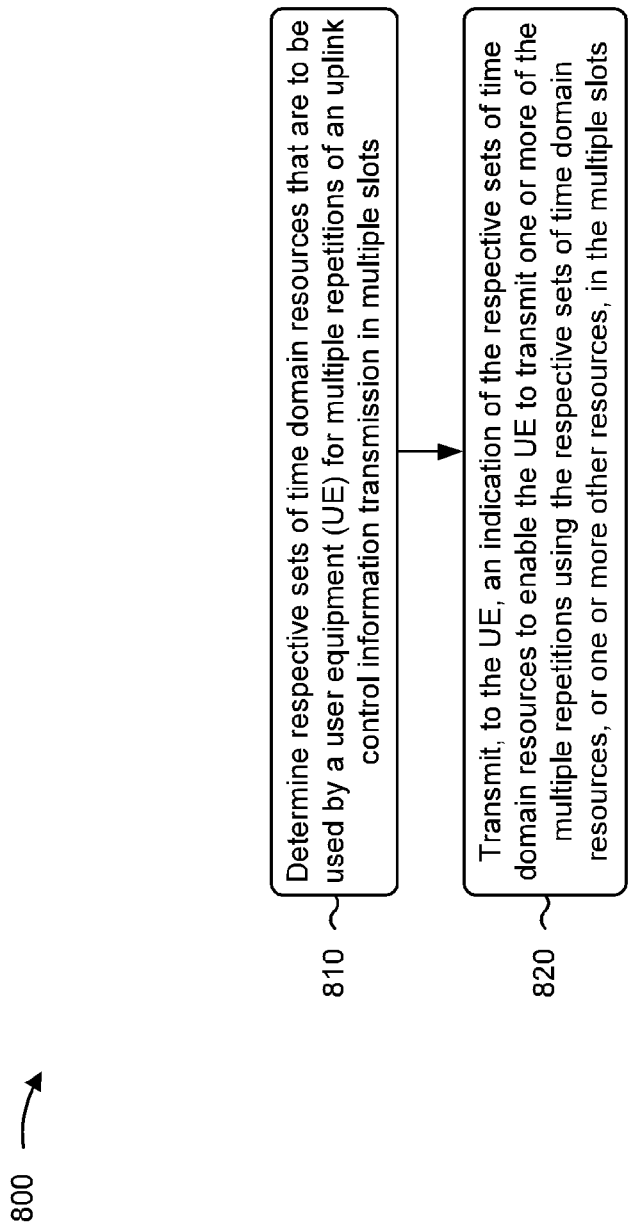
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 and/or the like) performs operations associated with uplink control communication repetition in multiple slots using different sets of time domain resources.

As shown in FIG. 8, in some aspects, process 800 may include determining respective sets of time domain resources that are to be used by a user equipment (UE) for multiple repetitions of an uplink control information transmission in multiple slots (block 810). For example, the base station (e.g., using transmit processor 220, receive processor 238, controller/processor 240, memory 242, and/or the like) may determine respective sets of time domain resources that are to be used by a UE for multiple repetitions of an uplink control information transmission in multiple slots, as described above.

As further shown in FIG. 8, in some aspects, process 800 may include transmitting, to the UE, an indication of the respective sets of time domain resources to enable the UE to transmit one or more of the multiple repetitions using the respective sets of time domain resources, or one or more other resources, in the multiple slots (block 820). For example, the base station (e.g., using transmit processor 220, receive processor 238, controller/processor 240, memory 242, and/or the like) may transmit, to the UE, an indication of the respective sets of time domain resources to enable the UE to transmit one or more of the multiple repetitions using the respective sets of time domain resources, or one or more other resources, in the multiple slots, as described above.

Process 800 may include additional aspects, such as any single aspect or any combination of aspects described below and/or in connection with one or more other processes described elsewhere herein.

In a first aspect, process 800 includes configuring one or more physical uplink control channel (PUCCH) resources, wherein the one or more PUCCH resources include the respective sets of time domain resources that are to be used by the UE for multiple repetitions of an uplink control information transmission in multiple slots.

In a second aspect, alone or in combination with the first aspect, the multiple slots are consecutive slots.

In a third aspect, alone or in combination with one or more of the first and second aspects, a first set of time domain resources for a first repetition of the uplink control information transmission occupies a first set of symbols in a first slot, and a second set of time domain resources for a second repetition of the uplink control information transmission occupies a second set of symbols in a second slot.

In a fourth aspect, alone or in combination with one or more of the first through third aspects, a last symbol of the first set of symbols is a last symbol in the first slot and a first symbol of the second set of symbols is a first symbol in the second slot.

In a fifth aspect, alone or in combination with one or more of the first through fourth aspects, process 800 includes transmitting a downlink communication indicating one or more PUCCH resource parameters, wherein the indication of the one or more PUCCH resource parameters enables the UE to determine the respective sets of time domain resources.

In a sixth aspect, alone or in combination with one or more of the first through fifth aspects, the one or more PUCCH resource parameters include at least one of: a starting symbol parameter; a length parameter; or a number of repetitions parameter.

In a seventh aspect, alone or in combination with one or more of the first through sixth aspects, process 800 includes determining multiple physical uplink control channel (PUCCH) resources associated with the respective sets of time domain resources that are to be used for the multiple repetitions of the uplink control information transmission in multiple slots.

In an eighth aspect, alone or in combination with one or more of the first through seventh aspects, process 800 includes transmitting a downlink communication to the UE including a first indication indicating a first PUCCH resource of the multiple PUCCH resources and a second indication indicating a second PUCCH resource of the multiple PUCCH resources.

In a ninth aspect, alone or in combination with one or more of the first through eighth aspects, process 800 includes transmitting a downlink communication to the UE including an indication that a first PUCCH resource and a second PUCCH resource of the multiple PUCCH resources are linked; and transmitting another downlink communication to the UE including another indication indicating the first PUCCH resource, wherein the indication that the first PUCCH resource and the second PUCCH resource are linked enables the UE to determine the second PUCCH resource based at least in part on determining the first PUCCH resource.

In a tenth aspect, alone or in combination with one or more of the first through ninth aspects, process 800 includes transmitting a first set of PUCCH resource parameters indicating a first set of time domain resources in a first slot for a first repetition of the uplink control information transmission; and transmitting a second set of PUCCH resource parameters indicating a second set of time domain resources in a second slot for a second repetition of the uplink control information transmission.

In an eleventh aspect, alone or in combination with one or more of the first through tenth aspects, process 800 includes transmitting a downlink communication to the UE including an indication indicating the first slot, wherein the indication indicating the first slot enables the UE to determine the second slot.

In a twelfth aspect, alone or in combination with one or more of the first through eleventh aspects, process 800 includes determining a PUCCH resource associated with the respective sets of time domain resources that is to be used for the multiple repetitions of the uplink control information transmission in multiple slots.

In a thirteenth aspect, alone or in combination with one or more of the first through twelfth aspects, process 800 includes determining a starting symbol and an ending symbol of the PUCCH resource based at least in part on a set of PUCCH resource parameters, wherein the starting symbol is in a first slot and the ending symbol is in a second slot; determining a first set of time domain resources of the respective sets of time domain resources based at least in part on the starting symbol and a slot boundary between the first slot and the second slot; and determining a second set of time domain resources of the respective sets of time domain resources based at least in part on the ending symbol and the slot boundary between the first slot and the second slot.

In a fourteenth aspect, alone or in combination with one or more of the first through thirteenth aspects, process 800 includes determining a quantity of symbols of the PUCCH resource in the first slot and a quantity of symbols of the PUCCH resource in the second slot based at least in part on the set of PUCCH resource parameters; and determining that the quantity of symbols in the first slot and the quantity of symbols in the second slot both satisfy a threshold quantity of symbols, wherein determining the first set of time domain resources and determining the second set of time domain resources is based at least in part on determining that the quantity of symbols in the first slot and the quantity of symbols in the second slot both satisfy the threshold quantity of symbols.

In a fifteenth aspect, alone or in combination with one or more of the first through fourteenth aspects, process 800 includes receiving a first repetition of the multiple repetitions of the uplink control information transmission using the first set of time domain resources; and receiving a second repetition of the multiple repetitions of the uplink control information transmission using the second set of time domain resources.

In a sixteenth aspect, alone or in combination with one or more of the first through fifteenth aspects, process 800 includes determining a quantity of repetitions of the multiple repetitions of the uplink control information transmission; and transmitting a downlink communication indicating the quantity of repetitions of the multiple repetitions of the uplink control information transmission associated with the PUCCH resource.

In a seventeenth aspect, alone or in combination with one or more of the first through sixteenth aspects, the indication of the respective sets of time domain resources transmitted to the UE indicates at least one of: a quantity of repetitions of the multiple repetitions; a starting symbol of a first repetition of the multiple repetitions; or a length of each repetition of the multiple repetitions.

In an eighteenth aspect, alone or in combination with one or more of the first through seventeenth aspects, process 800 includes determining that a set of time domain resources of the respective sets of time domain resources has a starting symbol in a first slot and an ending symbol in a second slot; determining a first set of time domain resources of the set of time domain resources based at least in part on the starting symbol and a slot boundary between the first slot and the second slot; and determining a second set of time domain resources of the set of time domain resources based at least in part on the ending symbol and the slot boundary between the first slot and the second slot.

In a nineteenth aspect, alone or in combination with one or more of the first through eighteenth aspects, each of the one or more of the multiple repetitions includes a demodulation reference signal symbol.

In a twentieth aspect, alone or in combination with one or more of the first through nineteenth aspects, process 800 includes enabling the UE to perform rate matching for each of the one or more of the multiple repetitions based at least in part on associated resources of each of the one or more of the multiple repetitions.

In a twenty-first aspect, alone or in combination with one or more of the first through twentieth aspects, process 800 includes transmitting, to the UE, an indication of a transmit power for each of the multiple repetitions.

In a twenty-second aspect, alone or in combination with one or more of the first through twenty first aspects, process 800 includes enabling the UE to transmit a first repetition of the one or more of the multiple repetitions using a first beam; and enabling the UE to transmit a second repetition of the one or more of the multiple repetitions using a second beam.

In a twenty-third aspect, alone or in combination with one or more of the first through twenty second aspects, process 800 includes enabling the UE to transmit all repetitions of the one or more of the multiple repetitions in a first slot of the multiple slots using a first beam; and enabling the UE to transmit all repetitions of the one or more of the multiple repetitions in a second slot of the multiple slots using a second beam.

In a twenty-fourth aspect, alone or in combination with one or more of the first through twenty third aspects, process 800 includes configuring each of the one or more of the multiple repetitions using a same format.

In a twenty-fifth aspect, alone or in combination with one or more of the first through twenty fourth aspects, process 800 includes configuring a first repetition of the one or more of the multiple repetitions using a first format; and configuring a second repetition of the one or more of the multiple repetitions using a second format.

In a twenty-sixth aspect, alone or in combination with one or more of the first through twenty fifth aspects, process 800 includes determining whether the UE is to drop one or more of the multiple repetitions of the uplink control information transmission in a slot of the multiple slots, or one or more different uplink communications in the slot of the multiple slots, based at least in part on a determination that the one or more different uplink communications are scheduled in one or more resources that overlap in a time domain with at least one of the respective sets of time domain resources that are to be used for multiple repetitions.

In a twenty-seventh aspect, alone or in combination with one or more of the first through twenty sixth aspects, a determination of whether to drop the one or more of the multiple repetitions or the one or more different uplink communications is with respect to a single repetition.

In a twenty-eighth aspect, alone or in combination with one or more of the first through twenty seventh aspects, process 800 includes comparing an uplink control information transmission type of the uplink control information transmission to an uplink control information transmission type of the one or more different uplink communications; and determining whether the UE is to drop the one or more of the multiple repetitions of the uplink control information transmission or the one or more different uplink communications based at least in part on comparing the uplink control information transmission types.

In a twenty-ninth aspect, alone or in combination with one or more of the first through twenty eighth aspects, process 800 includes determining that the one or more different uplink communications are physical uplink shared channel (PUSCH) communications; and determining that the UE is to drop the one or more different uplink communications based at least in part on determining that the one or more different uplink communications are PUSCH communications.

In a thirtieth aspect, alone or in combination with one or more of the first through twenty ninth aspects, process 800 includes determining whether the UE is to multiplex one or more of the multiple repetitions with one or more different uplink communications, based at least in part on a determination that the one or more different uplink communications are scheduled in one or more resources that overlap in a time domain with at least one of the respective sets of time domain resources that are to be used for multiple repetitions.

In a thirty-first aspect, alone or in combination with one or more of the first through thirtieth aspects, the determination of whether to multiplex the one or more of the multiple repetitions with the one or more different uplink communications is with respect to a single slot.

In a thirty-second aspect, alone or in combination with one or more of the first through thirty first aspects, the determination of whether to multiplex the one or more of the multiple repetitions with the one or more different uplink communications is with respect to a single repetition.

In a thirty-third aspect, alone or in combination with one or more of the first through thirty second aspects, the determination of whether to multiplex the one or more of the multiple repetitions with the one or more different uplink communications is with respect to the multiple repetitions in consecutive slots.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving an indication of respective sets of time domain resources that are to be used for multiple repetitions of an uplink control information transmission in multiple slots; and
    transmitting one or more of the multiple repetitions using the respective sets of time domain resources, or one or more other resources, in the multiple slots,
    wherein a physical uplink control channel (PUCCH) resource associated with the respective sets of time domain resources is to be used for the multiple repetitions of the uplink control information transmission in multiple slots,
    wherein a starting symbol and an ending symbol of the PUCCH resource is based at least in part on a set of PUCCH resource parameters, wherein the starting symbol is in a first slot and the ending symbol is in a second slot,
    wherein a first set of time domain resources of the respective sets of time domain resources is based at least in part on the starting symbol and a slot boundary between the first slot and the second slot, and
    wherein a second set of time domain resources of the respective sets of time domain resources is based at least in part on the ending symbol and the slot boundary between the first slot and the second slot.

2. The method of claim 1, wherein the multiple slots are consecutive slots.

3. The method of claim 1, wherein a last symbol of the first set of symbols is a last symbol in the first slot and a first symbol of the second set of symbols is a first symbol in the second slot.

4. The method of claim 1,
    wherein the respective sets of time domain resources is based at least in part on an indication of one or more physical uplink control channel resource parameters.

5. The method of claim 1, wherein multiple PUCCH resources are associated with the respective sets of time domain resources that are to be used for the multiple repetitions of the uplink control information transmission in multiple slots.

6. The method of claim 1,
wherein a first set of time domain resources in a first slot for a first repetition of the uplink control information transmission is based at least in part on a first set of PUCCH resource parameters, and
wherein a second set of time domain resources in a second slot for a second repetition of the uplink control information transmission is based at least in part on a second set of PUCCH resource parameters.

7. The method of claim 1,
wherein a quantity of repetitions of the multiple repetitions of the uplink control information transmission is based at least in part on one or more PUCCH resource parameters of the PUCCH resource.

8. The method of claim 1,
wherein transmitting one or more of the multiple repetitions comprises:
transmitting a first repetition of the one or more of the multiple repetitions using a first beam; and
transmitting a second repetition of the one or more of the multiple repetitions using a second beam.

9. The method of claim 1,
wherein transmitting one or more of the multiple repetitions comprises:
transmitting all repetitions of the one or more of the multiple repetitions in a first slot of the multiple slots using a first beam; and
transmitting all repetitions of the one or more of the multiple repetitions in a second slot of the multiple slots using a second beam.

10. The method of claim 1, further comprising:
dropping one or more of the multiple repetitions of the uplink control information transmission in a slot of the multiple slots, or one or more different uplink communications in the slot of the multiple slots, based at least in part on a determination that the one or more different uplink communications are scheduled in one or more resources that overlap in a time domain with at least one of the respective sets of time domain resources that are to be used for multiple repetitions.

11. The method of claim 1, further comprising:
multiplexing one or more of the multiple repetitions with one or more different uplink communications, based at least in part on a determination that the one or more different uplink communications are scheduled in one or more resources that overlap in a time domain with at least one of the respective sets of time domain resources that are to be used for multiple repetitions.

12. A method of wireless communication performed by a base station, comprising:
transmitting an indication of respective sets of time domain resources that are to be used by a user equipment (UE) for multiple repetitions of an uplink control information transmission in multiple slots, a first set of time domain resources for a first repetition of the uplink control information transmission occupying a first set of symbols in a first slot, and a second set of time domain resources for a second repetition of the uplink control information transmission occupying a second set of symbols in a second slot, the second set of symbols being different from the first set of symbols; and receiving one or more of the multiple repetitions using the respective sets of time domain resources, or one or more other resources, in the multiple slots,
wherein a physical uplink control channel (PUCCH) resource associated with the respective sets of time domain resources is to be used for the multiple repetitions of the uplink control information transmission in multiple slots,
wherein a starting symbol and an ending symbol of the PUCCH resource is based at least in part on a set of PUCCH resource parameters, wherein the starting symbol is in a first slot and the ending symbol is in a second slot,
wherein a first set of time domain resources of the respective sets of time domain resources is based at least in part on the starting symbol and a slot boundary between the first slot and the second slot, and
wherein a second set of time domain resources of the respective sets of time domain resources is based at least in part on the ending symbol and the slot boundary between the first slot and the second slot.

13. The method of claim 12,
wherein the multiple slots are consecutive slots.

14. The method of claim 12, wherein a last symbol of the first set of symbols is a last symbol in the first slot and a first symbol of the second set of symbols is a first symbol in the second slot.

15. The method of claim 12,
wherein the respective sets of time domain resources are based at least in part on an indication of one or more physical uplink control channel resource parameters.

16. The method of claim 12,
wherein multiple PUCCH resources are associated with the respective sets of time domain resources that are to be used for the multiple repetitions of the uplink control information transmission in multiple slots.

17. The method of claim 12,
wherein a first set of time domain resources in a first slot for a first repetition of the uplink control information transmission is based at least in part on a first set of physical uplink control channel resource parameters, and
wherein a second set of time domain resources in a second slot for a second repetition of the uplink control information transmission is based at least in part on a second set of PUCCH resource parameters.

18. The method of claim 12,
wherein a PUCCH resource associated with the respective sets of time domain resources is to be used for the multiple repetitions of the uplink control information transmission in multiple slots.

19. A user equipment (UE) for wireless communication, comprising:
a memory; and
one or more processors operatively coupled to the memory, the one or more processors configured to cause the UE to:
receive an indication of respective sets of time domain resources that are to be used for multiple repetitions of an uplink control information transmission in multiple slots, a first set of time domain resources for a first repetition of the uplink control information transmission occupying a first set of symbols in a first slot, and a second set of time domain resources for a second repetition of the uplink control information transmission occupying a second set of symbols in a second slot, the second set of symbols being different from the first set of symbols; and transmit one or more of the multiple repetitions using the respective sets of time domain resources, or one or more other resources, in the multiple slots, wherein a physical uplink control channel (PUCCH) resource associated with the respective sets of time domain resources is to be used for the multiple repetitions of the uplink control information transmission in multiple slots, wherein a starting symbol and an ending symbol of the PUCCH resource is based at least in part on a set of PUCCH resource parameters, wherein the starting symbol is in a first slot and the ending symbol is in a second slot, wherein a first set of time domain resources of the respective sets of time domain resources is based at least in part on the starting symbol and a slot boundary between the first slot and the second slot, and wherein a second set of time domain resources of the respective sets of time domain resources is based at least in part on the ending symbol and the slot boundary between the first slot and the second slot.

20. The UE of claim 19, wherein a last symbol of the first set of symbols is a last symbol in the first slot and a first symbol of the second set of symbols is a first symbol in the second slot.

21. The UE of claim 19,
wherein multiple PUCCH resources are associated with the respective sets of time domain resources that are to be used for the multiple repetitions of the uplink control information transmission in multiple slots.

22. The UE of claim 19,
wherein a quantity of repetitions of the multiple repetitions of the uplink control information transmission is based at least in part on one or more PUCCH resource parameters of the PUCCH resource.

23. A base station for wireless communication, comprising:
a memory; and
one or more processors operatively coupled to the memory, the one or more processors configured to cause the base station to:
transmit an indication of respective sets of time domain resources that are to be used by a user equipment (UE) for multiple repetitions of an uplink control information transmission in multiple slots; and
receive one or more of the multiple repetitions using the respective sets of time domain resources, or one or more other resources, in the multiple slots, wherein a physical uplink control channel (PUCCH) resource associated with the respective sets of time domain resources is to be used for the multiple repetitions of the uplink control information transmission in multiple slots, wherein a starting symbol and an ending symbol of the PUCCH resource is based at least in part on a set of PUCCH resource parameters, wherein the starting symbol is in a first slot and the ending symbol is in a second slot, wherein a first set of time domain resources of the respective sets of time domain resources is based at least in part on the starting symbol and a slot boundary between the first slot and the second slot, and wherein a second set of time domain resources of the respective sets of time domain resources is based at least in part on the ending symbol and the slot boundary between the first slot and the second slot.

24. The method of claim 1,
wherein at least one symbol of the first set of symbols is a different symbol value than a symbol value of at least one symbol of the second set of symbols.

25. The method of claim 12,
wherein at least one symbol of the first set of symbols is a different symbol value than a symbol value of at least one symbol of the second set of symbols.

26. The UE of claim 19,
wherein at least one symbol of the first set of symbols is a different symbol value than a symbol value of at least one symbol of the second set of symbols.

27. The base station of claim 23,
wherein at least one symbol of the first set of symbols is a different symbol value than a symbol value of at least one symbol of the second set of symbols.

28. The UE of claim 19, wherein the multiple slots are consecutive slots.

29. The UE of claim 19, wherein the respective sets of time domain resources is based at least in part on an indication of one or more physical uplink control channel resource parameters.

30. The UE of claim 19,
wherein a first set of time domain resources in a first slot for a first repetition of the uplink control information transmission is based at least in part on a first set of PUCCH resource parameters, and
wherein a second set of time domain resources in a second slot for a second repetition of the uplink control information transmission is based at least in part on a second set of PUCCH resource parameters.

* * * * *